July 6, 1926.

F. W. LANCHESTER 1,591,494

TRANSMISSION AND CHANGE GEAR MECHANISM OF MOTOR VEHICLES

Filed Oct. 12, 1923

Inventor
F. W. Lanchester
By Marks & Clerk Attys.

Patented July 6, 1926.

1,591,494

UNITED STATES PATENT OFFICE.

FREDERICK WILLIAM LANCHESTER, OF LONDON, ENGLAND.

TRANSMISSION AND CHANGE-GEAR MECHANISM OF MOTOR VEHICLES.

Application filed October 12, 1923, Serial No. 668,221, and in Great Britain October 19, 1922.

The present invention relates to improvements in the transmission and change gear mechanism of motor vehicles and refers more particularly to an improved transmission and change gear mechanism applicable to vehicles in which the propulsion is effected by direct friction drive between the motor shaft or a motor driven shaft and the road wheel or road wheel axle.

The present invention consists in brief in a combination comprising a direct friction drive by means of a spool or friction pulley on the motor driven shaft or a pair of such spools or pulleys and a friction drum or a pair of such drums on the road wheel axle or axles adapted to be put into engagement therewith and subsidiary driving means by an additional spool or spools driven by chain or gearing from the motor driven axle adapted to be alternatively brought into engagement with the friction drum or drums aforesaid.

In one mode of constructing transmission and change gear mechanism in accordance with the present invention the driving road wheels of the vehicle are mounted on independent tubular axles, each of which carries a cylindrical friction drum of considerable diameter. The two tubular axles aforesaid are mounted on a common shaft to secure their alignment and are so carried as to permit of this shaft having a certain degree of motion imparted to it in a direction at right angles to its axis. This motion may be upwards and downwards or forwards and backwards, or may partake of both. The main drive consists of two friction spools adapted to engage with the drums aforesaid and situated at the extremities of the motor crank-shaft to which they may be rigidly connected, or may be driven through a suitable coupling. In a position adjacent to the main driving spool mountings cylindrical housings are arranged each carrying two subsidiary spools, the first of these spools being driven by a chain gear from the motor shaft and the second by toothed gear from the first. The mountings of these two spools in the cylindrical housing are on opposite sides of the axis of the latter and the housing is permitted a certain degree of movement about its axis under control of a change gear lever in the hands of the driver. The subsidiary spools aforesaid are preferably of less diameter than the main spool and the chain drive is conveniently arranged to gear down. The gear drive between the two subsidiary spools may be an equal drive or may be made of any convenient or desired ratio.

Assuming that the main drive is in operation, change gear is effected by imparting a receding movement to the road wheel axle which for this purpose is conveniently coupled to a pedal controlled by the driver. The subsidiary spool housing is then brought into one of its extreme positions in which, on the release of the pedal, the friction drum engages with one or other of the two spools. The chain driven spool furnishes the low gear and the spool driven by the spur gearing gives the reverse. The lever controlling the subsidiary spool housing is furnished with a pawl or catch-plate engaging with a segment having three notches; one extreme notch corresponds to the low gear, the other extreme notch to the reverse and the central notch to the main drive.

Referring to the accompanying sheet of drawings which are diagrammatic:—

Figure 1:
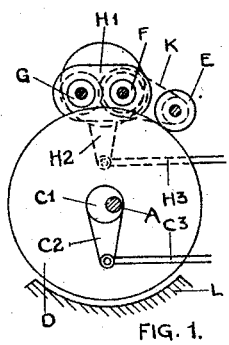
Figure 1 illustrates a driving mechanism in accordance with the present invention in which the main drive is in operation.
Figure 5:
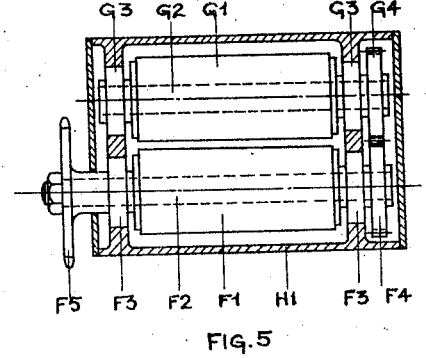
Figure 5 is a view in greater detail of a spool assemblage appropriate to the general arrangement shown in Figures 1, 2 and 3.
Figure 6:
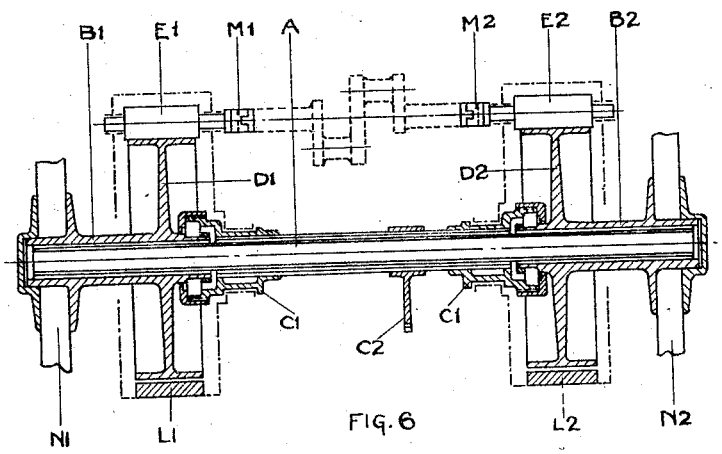
Figure 6 shows a general section through the road wheels, road wheel axle, friction drums and main driving spools.

Referring more particularly to Figures 1, 2, 3, 5 and 6, A is a road wheel axle carrying a hub part B, on which is mounted the road wheels $N_1$, $N_2$, shown in part in Figure 6, and a brake drum D. The axle and hub assemblage is housed in an eccentrically mounted tube $C_1$, controlled by a lever $C_2$. A main driving spool E mounted in suitable bearings is driven positively from the motor crankshaft and in the position shown in Figure 1 is in frictional engagement with the drum D whereby one of the road wheels is driven. F and G are subsidiary spools mounted in the housing $H_1$ under control of the lever $H_2$, whereby as in Figure 2 F is brought into engagement with the friction drum and in Figure 3 G is in engagement. The spool F is driven from the main spool E by a chain drive K and the spool G is driven from the spool F by spur gearing indicated by dotted circles, in Figures 1, 2, 3 and by the figures $F_4$, $G_4$ in Figure 5. The diameters of the spools F and G and the ratios of the chain and spur gearing are arranged to give whatever gear ratio is required as between the direct drive (main spool) and the low gear and reverse respectively.

The eccentric housing $C_1$ is operated by a clutch pedal acting through link $C_3$ so that pressure on the clutch pedal first disengages the spool drive and then brings the brake shown at L into operation, the friction drum D serving alternatively as a driving member and a braking member. Gear change is conveniently effected by depressing the pedal to throw the main spool drive out of action, operating the change gear lever controlling the link $H_3$ and releasing the pedal, the mode of operation in this respect being similar to those in cars employing change gear of the ordinary type.

Figure 2:
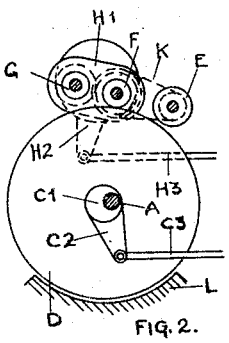
Figure 2 illustrates the same mechanism in which a low gear is in operation, and Figure 3 the same mechanism in which a reversing gear is in the position for reverse.
Figure 3:
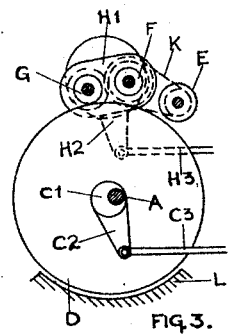

Referring more particularly to Figure 5, the spools $F_1$ and $G_1$ are mounted on short transverse shafts, $F_2$, $G_2$, in ball bearings $F_3$, $G_3$, housed at either end and are geared together by spur gearing $F_4$, $G_4$, of approximately equal ratio. The spools are preferably of less diameter than the main spool and if in addition to this further gear reduction is required the chain drive, of which the driven wheel $F_5$ is shown in Figure 5, is itself arranged as a gear-down, that is to say there are fewer teeth on the driving than on the driven element. This is as indicated in Figures 1, 2 and 3.

Figure 4:
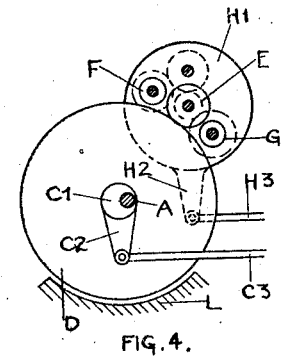
Figure 4 illustrates a modification in which a single housing serves for all three spools.

In Figure 4 the subsidiary spools F and G are shown as mounted in the same housing as the main spool E, the former being situated one on each side of the latter. The housing, which is concentric with the main spool is operated in just the same manner as the housing $H_1$ in Figures 1, 2 and 3, but as drawn in the opposite sense. In Figure 4 the reversing spool G is driven by direct spur gear from the main spool and the low gear is shown as driven through an intermediate spur wheel. If preferred a chain drive may be adopted.

In the arrangement illustrated in Figures 1, 2, 3 and 5, the spools F and G may be geared together by a chain drive or equivalent in cases where a reverse gear is not deemed necessary, and three spools of appropriate diameters and driving ratios may be so arranged as to give three forward ratios instead of two forward and reverse. Likewise in Figure 4 chain drives or intermediate gears may be adopted between the main spool and both subsidiary spools.

Although it is possible to employ a single train of mechanism as described in Figures 1 to 5 for propulsion of a motor vehicle it is preferable to furnish the mechanism in duplicate as shown in Figure 6, in which the subsidiary spools are not shown. In this case the hub members $B_1$, $B_2$ are preferably mounted to run freely on the floating axle A so that when the spools are not in engagement the road wheels can rotate independently of one another, thus obviating the need for a differential gear. The main spools $E_1$ and $E_2$ are shown as driven direct from the motor crank shaft which is indicated by dotted lines through couplings $M_1$, $M_2$. It will be understood that the subsidiary spools are supplied on both hands as ancillary to the main spools after the manner described with reference to Figures 1, 2, 3, 5 or to Figure 4.

Having now described my invention what I claim as new and desire to secure by Letters Patent is:—

1. A motor vehicle transmission and change gear mechanism, including a vehicle chassis, an axle, bearings for said axle, a vehicle driving wheel and a friction drum mounted on said axle, a driving spool mounted on said chassis above said drum, means for moving said chassis and spool, relatively to said axle, so as to support part of the weight of the vehicle upon the axle, either through said axle bearings, said spool and drum under these conditions being out of contact, or through said spool and drum.

2. A motor vehicle transmission and change gear mechanism, including a vehicle chassis, an axle, bearings for said axle, a vehicle driving wheel and a friction drum mounted on said axle, a driving spool mounted on said chassis above said drum, a pivotal mounting on said chassis, a subsidiary spool on said mounting, driving means between said spools, means for rocking said mounting so as to bring one or other of said spools into operative relationship with said drum, separately operable means for moving said chassis movable mounting and spools relatively to said axle so as to support part of the weight of the vehicle upon the axle either through said axle bearings, said drum and spools under these conditions being out of contact, or through said drum and one of said spools.

3. A motor vehicle transmission and change gear mechanism, including a vehicle chassis, an axle, bearings for said axle, a vehicle driving wheel and a friction drum mounted on said axle, a driving spool mounted on said chassis above said drum, a pivotal mounting, a plurality of subsidiary spools on said mounting, driving means between said subsidiary spools and said main spool, means for rocking said mounting so as to bring any of said spools into operative relationship with said drum, separately operable means for moving said chassis pivotal mounting and spools relatively to said axle, so as to support part of the weight of the vehicle upon the axle either through said axle bearings, said drum and spools under these conditions being out of contact, or through said drum and one of said spools.

4. A motor vehicle transmission and change gear mechanism including a direct friction drive embodying a main spool mounted to rotate about a fixed axis, a drum which is mechanically coupled to a driving wheel of the vehicle, a subsidiary spool, a mounting for said subsidiary spool enabling the latter to be rocked into one of two positions, driving means between said subsidiary and main spools, means for rocking said drum into or out of friction engagement with said driving or subsidiary spools, a further subsidiary spool arranged in association with the main spool, and means for driving said further spool from the main spool in an opposite direction of rotation to that of the first-mentioned subsidiary spool so as to effect a reverse drive when in operation.

In testimony whereof I have signed my name to this specification.

FREDERICK WILLIAM LANCHESTER.